(12) United States Patent
Ladell et al.

(10) Patent No.: US 9,192,863 B2
(45) Date of Patent: Nov. 24, 2015

(54) SELECTIVE CACHING OF INTERACTIVE OBJECTS

(71) Applicant: Disney Enterprises, Inc., Burbank (CA)

(72) Inventors: Ross A. Ladell, Kelowna (CA); Andrew J. Doll, Kelowna (CA); Heath S. Farrow, Kelowna (CA); Gordon R. Quigley, Kelowna (CA); Christopher Quigley, Kelowna (CA)

(73) Assignee: DISNEY ENTERPRISES, INC., Burbank, CA (US)

( * ) Notice: Subject to any disclaimer, the term of this patent is extended or adjusted under 35 U.S.C. 154(b) by 245 days.

(21) Appl. No.: 14/066,077

(22) Filed: Oct. 29, 2013

(65) Prior Publication Data

US 2015/0119139 A1   Apr. 30, 2015

(51) Int. Cl.
   *A63F 9/24*       (2006.01)
   *A63F 13/67*      (2014.01)
   *G06T 1/60*       (2006.01)
   *A63F 13/58*      (2014.01)

(52) U.S. Cl.
   CPC ............... *A63F 13/67* (2014.09); *A63F 13/58* (2014.09); *G06T 1/60* (2013.01)

(58) Field of Classification Search
   CPC ............ A63F 13/67; A63F 13/58; G06T 1/60

USPC ............................................................. 463/31
See application file for complete search history.

(56) References Cited

U.S. PATENT DOCUMENTS

| | | | | |
|---|---|---|---|---|
| 2008/0273218 A1* | 11/2008 | Kitora | ................. | G06K 9/00463 358/1.13 |
| 2013/0162664 A1* | 6/2013 | Peacock | .................... | G06T 1/60 345/543 |
| 2014/0010303 A1* | 1/2014 | Hong | ..................... | H04N 19/51 375/240.16 |

FOREIGN PATENT DOCUMENTS

CN           103177419 A    *  6/2013

* cited by examiner

*Primary Examiner* — Corbett B Coburn
(74) *Attorney, Agent, or Firm* — Dorsey & Whitney LLP

(57) ABSTRACT

The present disclosure may take the form of a method for enhancing performance of interactive content. The method includes analyzing by a processing element a user actuated object of the interactive content, predicting action of the user actuated object in a proceeding frame of the interactive content, using the predicted action, determining by the processing element if the user actuated object can be cached for the proceeding frame, if the user actuated object can be cached, saving the user actuated object as a bitmap object and display the bitmap object in the proceeding frame and if the user actuated object cannot be cached, rendering a vector graphic of the user actuated object in the proceeding frame.

16 Claims, 4 Drawing Sheets

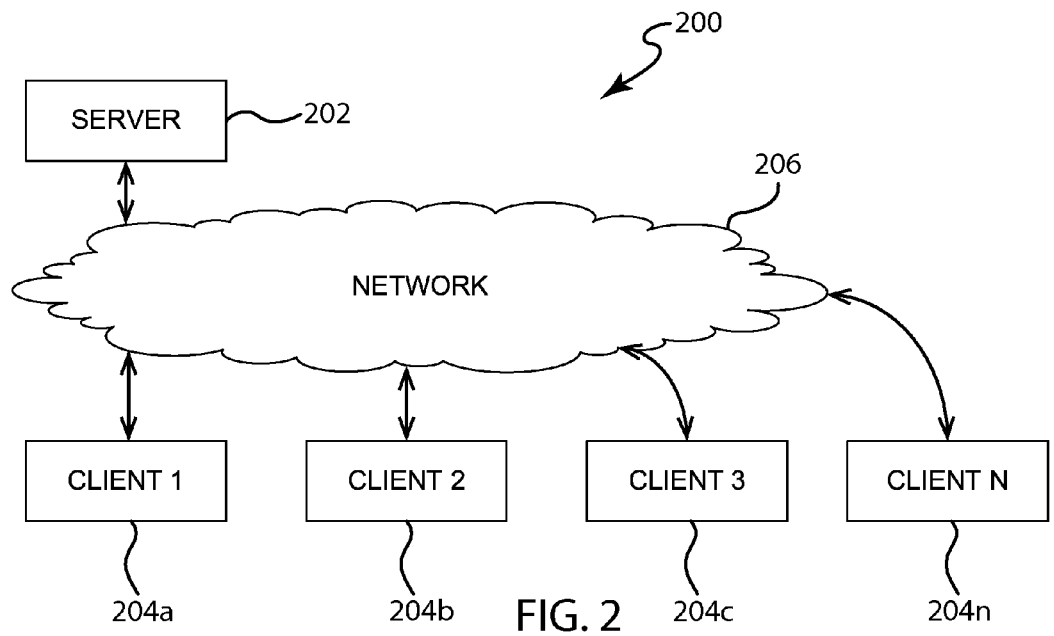
FIG. 2
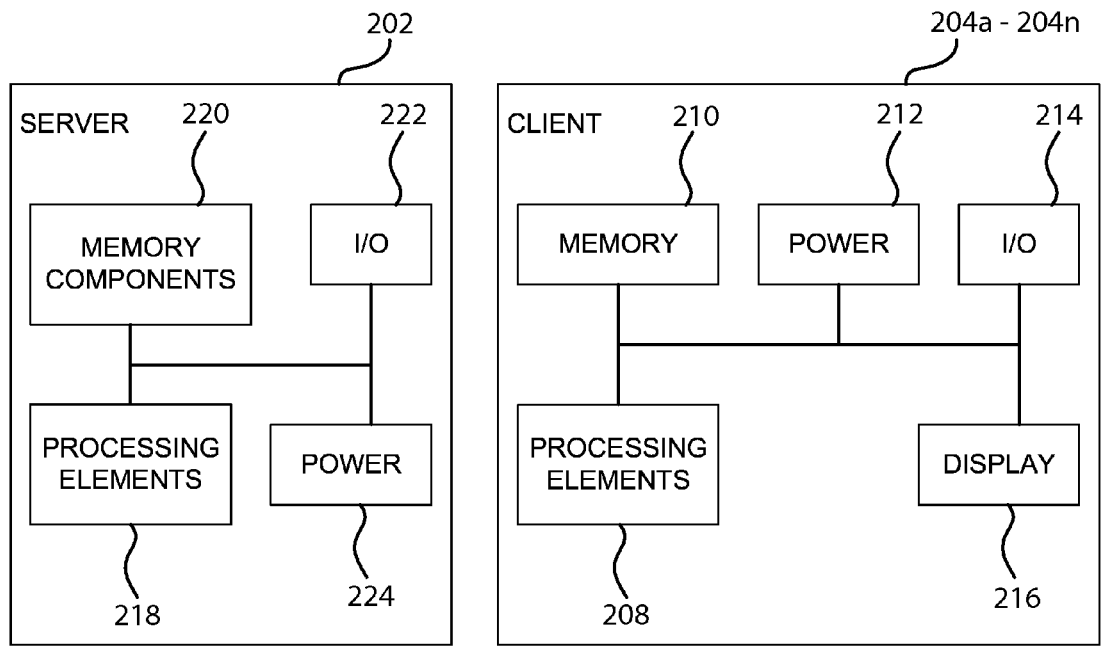
FIG. 3A
FIG. 3B

SELECTIVE CACHING OF INTERACTIVE OBJECTS

FIELD

The present invention relates generally to software programs and more specifically to software programs for video games configured to be run on computing devices.

BACKGROUND

Some video games are accessible through a networked environment to allow multiple users to play at the same time and interact with one another. Often networked games for multiple users or massive multi player online (MMO) are implemented on a server with a plurality of client devices that receive data from the server. In these configurations certain tasks, such as drawing objects, may be done on the client-side rather than the server side. The completion of these tasks can be hindered by the limitations of the client device and may reduce the frame rate and performance of the video game as it is experienced by the user.

It is with these shortcomings in mind that the present invention has been developed.

SUMMARY

One embodiment of the present disclosure may take the form of a method for enhancing performance of interactive content. The method includes analyzing by a processing element a user actuated object of the interactive content and predicting action of the user actuated object in a proceeding frame of the interactive content. Then, using the predicted action, the method includes determining by the processing element if the user actuated object can be cached for the proceeding frame. If the user actuated object can be cached, the method includes saving the user actuated object as a bitmap object and display the bitmap object in the proceeding frame and if the user actuated object cannot be cached, rendering a vector graphic of the user actuated object in the proceeding frame.

Another embodiment of the disclosure may take the form of a computing device for executing an interactive content program. The computing device includes a non-transient memory component storing executable programming instructions, an input/output interface configured to transmit and receive data and a processor in communication with the memory component and the input/output interface. The processor is configured to execute the programming instructions, which when executed perform the following operations: predict a future action of a user actuated object of the interactive content program and selectively store a bitmap of the user actuated object based on the predicted future action of the user actuated object.

Yet another embodiment of the disclosure may take the form of a method for reducing a processing load of a processing element executing a video game. The method includes analyzing by the processing element movement of a character controlled by a user input, determining by a processor whether the character remained still during a predetermined time limit of the video game; when the character remains still during the predetermined time limit, indicating by the processing element that the character is available to be cached; and when the character does not remain still during the predetermined time limit, indicating by the processing element that the character is to be rendered as a vector graphic.

BRIEF DESCRIPTION OF THE DRAWINGS

FIG. 2 is a block diagram of a system that is used to implement the interactive video game.

FIG. 3A is a simplified block diagram of a client device of the system FIG. 2.

FIG. 3B is a simplified block diagram of a server of the system of FIG. 2.

SPECIFICATION

Overview

Figure 1:
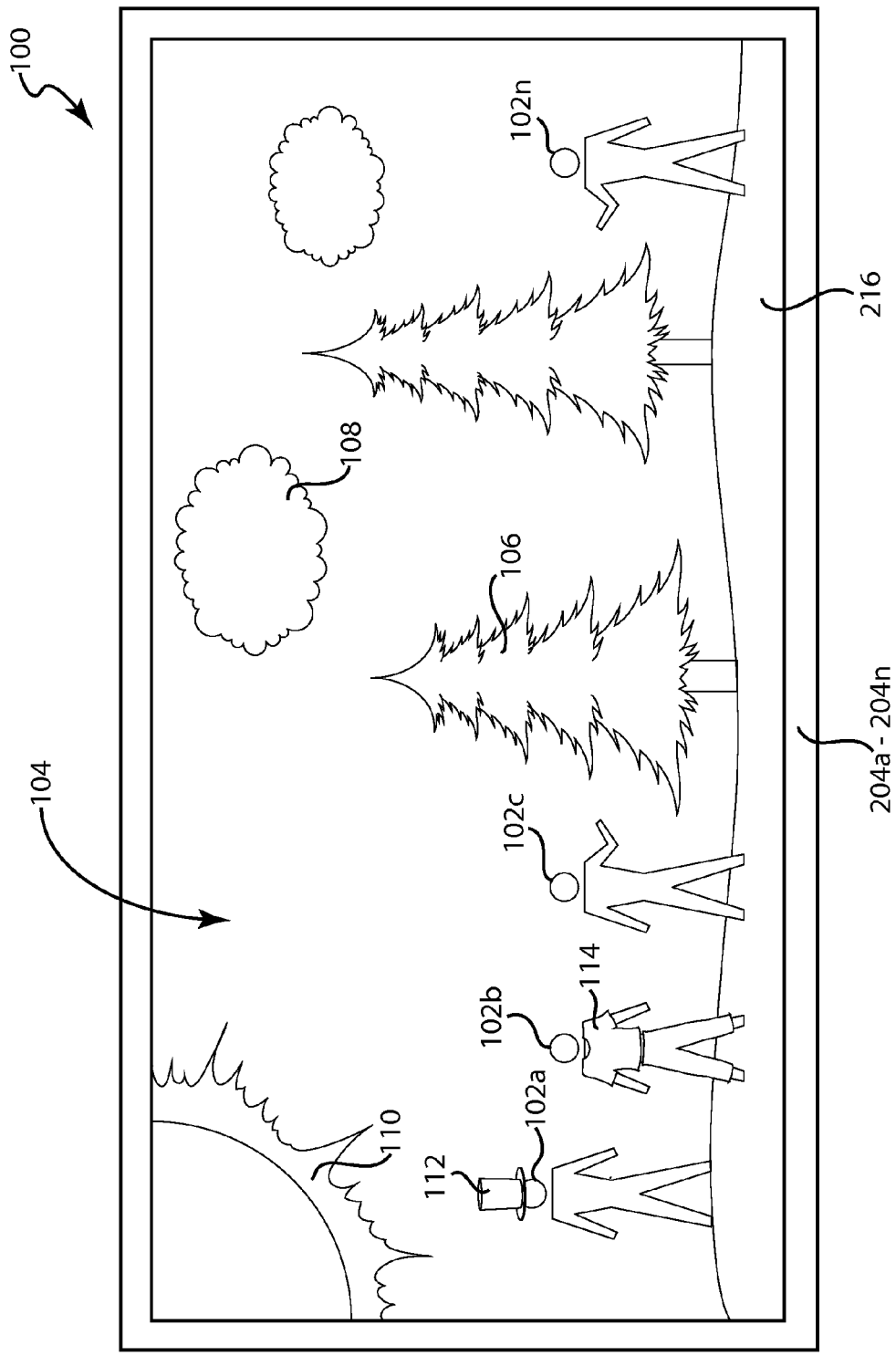
FIG. 1 is a front elevation view of a frame of an interactive video game.

The present disclosure is related to methods that can be used to increase the frame rate and performance of interactive content, such as video games. In a particular embodiment, the method may be used to enhance the performance of network based video games, such as online video games run on Flash, Shockwave, and other dynamic hypertext markup language (dynamic HTML) technologies. The present disclosure uses a toggle to selectively activate and deactivate bit map caching for objects and/or characters within the game environment. When activated, a vector object, such as a character, is rendered as a bitmap and the rendered bitmap is used to replicate the character in the proceeding frame or set of frames. Because the object is saved as a bit map and the vector graphics do not have redrawn for the select frame, performance for the game can be enhanced. When deactivated, the vector object is drawn with vector graphics, which allows the character to be updated to include changes based on the game (e.g., animation of the object) or as otherwise desired.

The toggle activates the cache feature based on a predictive analysis of objects within the video game environment. As one example, one or more frames of the game may be analyzed to predict the future actions of the object (such as a character). The analysis may be based on time, content, user preferences, user history, or the like. Time based analysis can include analyzing the length between movements or analyzing certain actions of the object or other objects, e.g., the character has not moved in the last two frames and therefore the character can be predicted to be unlikely to move in the next frame and thus cached. Content based analysis can include analyzing actions or events in the game to predict future actions of a character or object. User preferences and user history can include looking toward typical behavior of a user to predict the future behavior of the user within the game environment. The parameters may be used alone or in combination with one another, e.g., the analysis can take into account two or more parameters or a single parameter.

It should be noted that the method described herein may be used for a plurality of objects within the game environment. For example, in a particular frame a plurality of characters may be analyzed to determine if they need to be redrawn for the next frame or frames. The number of characters analyzed and optionally cached may be varied as desired.

The predictive analysis of the methods in the present disclosure allows users to continue to move and interact with objects in the game environment, while at the same time enhancing the performance of the game. By selecting caching characters and/or objects within the game, the frame rate performance may increase by 20 to 30% as compared to not caching objects or characters. For example, in a MMO game environment there may be many objects that move or change between frames, which can require a significant amount of processing time, by selectively caching objects the processing time can be reduced, enhancing the performance of the game. Moreover, the present disclosure provides methods for caching animated objects, which is typically not done in conventional video games because caching an animated object and displaying the cached image can degrade the appearance of the object as it moves in the next frame the movement is not shown. However, by analyzing whether an object is likely to be animated in a future frame, the object can be cached without degrading the appearance of the object and enhancing the performance of the game.

DETAILED DESCRIPTION

Turning now to the figures, a system for implementing methods for improving performance of network based content will now be discussed in further detail. FIG. 1 is a front elevation view of an illustrative network based game. FIG. 2 is a block diagram illustrating a system for implementing the game of FIG. 1. With reference to FIGS. 1 and 2, a game 100 or other interactive content may include a scene 104 with a plurality of objects. The objects may include user actuated objects 102a, 102b, 102c . . . 102n as well as scene objects 106, 108, 110, 112, 114.

The scene objects 106, 108, 110, 112, 114 are those objects within the game 100 environment that provide the background features (e.g., trees, buildings, etc.), provide elements for the user actuated objects to interact with, or may be non-user actuated characters such as those controlled by the game rather than users. The user actuated objects 102a, 102b, 102c may be characters in the game or other movable elements that respond to one or more user commands. The user actuated objects 102a, 102b, 102c can typically be moved around to different locations within the scene 104 and can interact with the scene objects 106, 108, 110, 112, 114. As one example, the user actuated objects 102a, 102b, 102c can "wear" certain scene objects 112, 114, which may be illustrated as accessories or clothing. As another example, the user actuated objects 102a, 102b, 102c can climb, break, jump, or perform other actions with or to the scene objects 106, 108, 110, 112, 114. The types of movements and interactions between the user actuated objects 102a, 102b, 102c and the scene objects 106, 108, 110, 112, 114 vary based on the type of game 100, level within the game 100, and other variable parameters.

The number of user actuated objects 102a, 102b, 102c, 102na and scene objects 106, 108, 110 are variable as desired and the user actuated objects typically depend on the number of users interacting with the game 100.

With reference to FIGS. 1 and 2, in some embodiments, the game 100 is a network based interactive content and is distributed to one or more client devices. In particular, a system 200 for providing access to the game 100 may include one or more servers 202 that interact with one or more client devices 204a-n through a network 206. The network 206 may be substantially any type of communication structure that allows for computing devices to communicate with one another. Some non-limiting examples of a network 206 include a local area network, wireless local area network, wide area network, metropolitan area network, storage area network, and so on.

FIG. 3A is a simplified block diagram of the server 202 of the system 200 of FIG. 2. With reference to FIG. 3A, the server 202 may include one or more processing elements 218, one or more memory components 220, an input/output interface 222, and a power source 224. The various components of the server 202 are generally in communication with one another such as through one or more system buses, electrical traces, or other communication mechanisms.

The one or more processing elements 218 include devices that are capable of receiving and executing instructions. Examples of processing elements include microprocessors, microcomputers, processors, and the like.

The one or more memory components 220 store electronic data that is utilized by the server 202. For example, the memory component 220 may store electrical data or content e.g., audio files, video files, document files, and so on, corresponding to various applications. As some non-limiting examples, the memory component 220 may be non-volatile storage, a magnetic storage medium, optical storage medium, magneto-optical storage medium, read only memory, random access memory, erasable programmable memory, or flash memory.

The input/output interface 222 of the server 202 may receive data from one or more electronic devices, such as the client devices 204a-n and may also facilitate transmission of data to the client devices 204a-n, to other electronic devices, to one or more users, or the like. In the system 200 of FIG. 2, the input/output interface 222 is used to transmit and receive data from the network 206 either through a wireless or wired connection (Internet, WiFi, Bluetooth, and Ethernet being a few examples). Additionally, the input/output interface 222 may support multiple network or communication mechanisms.

The power source 224 provides power to the server 202 and its internal components. The power source 224 may generally be a connection cord that connects the servers 202 to an external power element. However, in some embodiments, the power source 224 may be portable, such as batteries, or the like.

The client devices 204a-n may be similar to the server 202 but in some embodiments may generally have less storage and processing power as compared to the server 202. However, the client devices 204a-n may generally be more portable as compared to the server 202. The client devices 204a-n may be substantially any type of computing device that can receive data and execute instructions. Some examples of client devices 204a-n include laptop computers, tablet computers, personal computers, smart phones, set top boxes, televisions, portable gaming devices, and so on.

FIG. 3B is a simplified block diagram of an illustrative client device. As shown in FIG. 3B, the client devices 204a-n may include similar components to the server 202, such as one or more processing elements 208, one or more memory components 210, a power source 212, an input/output interface 214, and optionally a display 216. The processing elements 208, memory component 210, and input/output interface 214 include similar elements to those described above with respect to the server 202. However, in many embodiments the processing element 208, memory 210, and input/output interface 214 may be more portable than their counterparts in the server 202 (e.g., smaller, require less power, or the like).

Additionally, the input/output interface 214 of the client devices 204a-n receives user input and provides that to the processing element 208. For example, the input/output interface 214 may be used to receive data from one or more input/output devices, such as, but not limited to, a keyboard, mouse, track pad, joystick, remote control, input sensors, or the like. The input/output interface 214 is typically configured to allow a user to provide input to the client device 204a-n to control one or more aspects of the user actuated object 102a-n. As an example, the user may be used to control the movements, appearance, and other characteristics of the user actuated objects 102a-n via one or more input/output devices.

The input/output interface 214 of the client devices 204a-n may further be configured to transmit and receive data to and from the server 202 as well as other client devices 204a-n. As an example, the input/output interface 214 receives and transmits data through the network 26 to the server 202 and other client devices. The input/output interface 214 in some instances may communicate through multiple channels at a time, e.g., the input/output interface 214 may transmit data to the network 206 through an Internet, WiFi, or Ethernet connection and simultaneously be transmitting data to another electronic device or a peripheral device through a Bluetooth channel. The types of communication mechanisms and channels that are used by the input/output device 214 may be varied as desired.

In some instances the client devices 204a-n may be portable and in these instances the power source 212 may also be portable. For example, the power source 212 may include batteries, solar cells, or the like. The type of power source 212 can be varied as desired. Additionally, the client devices 204a-n may also include a permanent power source, such as a power cord that connects to an external power source. The power cord may be used in addition to or instead of a portable power source.

The client devices 204a-n in many embodiments are in communication with a display 216. The display 216 provides a visual output for the client devices 204a-n and is used to output the visual components of the game 100, e.g., the scene 104 and objects. The display may be integrated to the client devices 204a-n (e.g., tablet computer or smart phone) or may be a separate component in communication therewith (e.g., monitor that connects to a personal computer).

With reference again to FIGS. 1 and 2, to operate the game 100, the server 202 provides (via the network 206) programming instructions to the client devices 204-n which then execute those instructions. In particular, as the game 100 is being run the server 202 may update the client devices 204a-n with information corresponding to the game 100, such as but not limited to, movements of the user actuated objects 102a-n and/or interactions between the scene objects 104, 106, 108, 110, 112, 114. In this manner, each client device 204a-n displaying and users interacting with the game 100 through each of those client devices 204a-n experience substantially the same interactions within the game 100.

In some embodiments, the server 202 provides the client devices 204a, 204b, 204c with programming instructions that correspond to the game 100. As an example, the server 202 can provide the client devices 204a-n with instructions corresponding to one or more levels of the game, which are executed by the processing elements 208 of the client devices 204a-n to run the game 100. As the game 100 is being run the server 202 typically updates the client devices 204a, 204b, 204c with information corresponding to the game 100, such as, but not limited to, movements of various user actuated objects 102a, 102b, 102c and/or interactions between user actuated objects 102a, 102b, 102c and the scene objects 104, 106, 108, 110, 112, 114. For example, in instances where the game 100 may include multiple users, each client device 204a-n transmits data correspond to inputs of the user of that client device 204a-n (e.g., input from an input device to the client device 204a-n) that correspond to movements or interactions within the game 100. Continuing with this example, the user provides input to move his or her user actuated object 102a-n, the client device 204a-n provides this data to the server 202 which then provides the information to the other client devices so that the movements of the user actuated object displayed on each client device are updated with the inputs from the user, e.g., a user moves a first object and that object is moved in the game 100 on every client device.

With continued reference to FIGS. 1 and 2, as users interact with the game 100 through the client devices 204a-n, the user actuated objects 102a-n move, change, interact with other user actuated objects 102a-n, and/or scene objects 106, 108, 110, 112, 114. In some embodiments, each user actuated object 102a-n is an animated object that may contain vector graphics (such as text, gradients, or the like). In other words, the object may be rasterized by the processing element 208 of the client device 204a-n (or the server if rendered there) by using mathematical instructions, such as geometric properties, which are varied as the user provides inputs to the client device 204a-n. As an example, in a first frame of the game 100, the user actuated object 102a-n may be at a first location and in a first position and in response to a user input, the user actuated object 102a-n may move to a second location and a second position. In this example, the processing element 208 receives the user inputs and using the initial vector information of the object render the object in the new position and location.

As the object 102a-n is moved and changed, the properties of the lines, curves, colors, etc. that are used to illustrate the object 102a-n are also changed, which generally requires that the object be redrawn or created in order to incorporate those changes. Because the client devices 204a-n and the server 202 typically do not know what movements or actions the users may input to the game 100, each user actuated object 102a-n may typically be rendered every frame so that movements and animations of the user actuated object 102a-n and/or scene objects 1006, 108, 110, 112, 114 are illustrated. However, rendering each user actuated object 102a-n per frame may require processing time by the processing elements 208, 218 of the client devices 204a-n and/or server 202, which decrease responsiveness of objects within the game and the output of the game. For example, the game 100 may experience lag or latency as users provide input to move the user actuated objects 102a-n the there is a time differential between the input and then corresponding output shown in the game 100.

Figure 4:
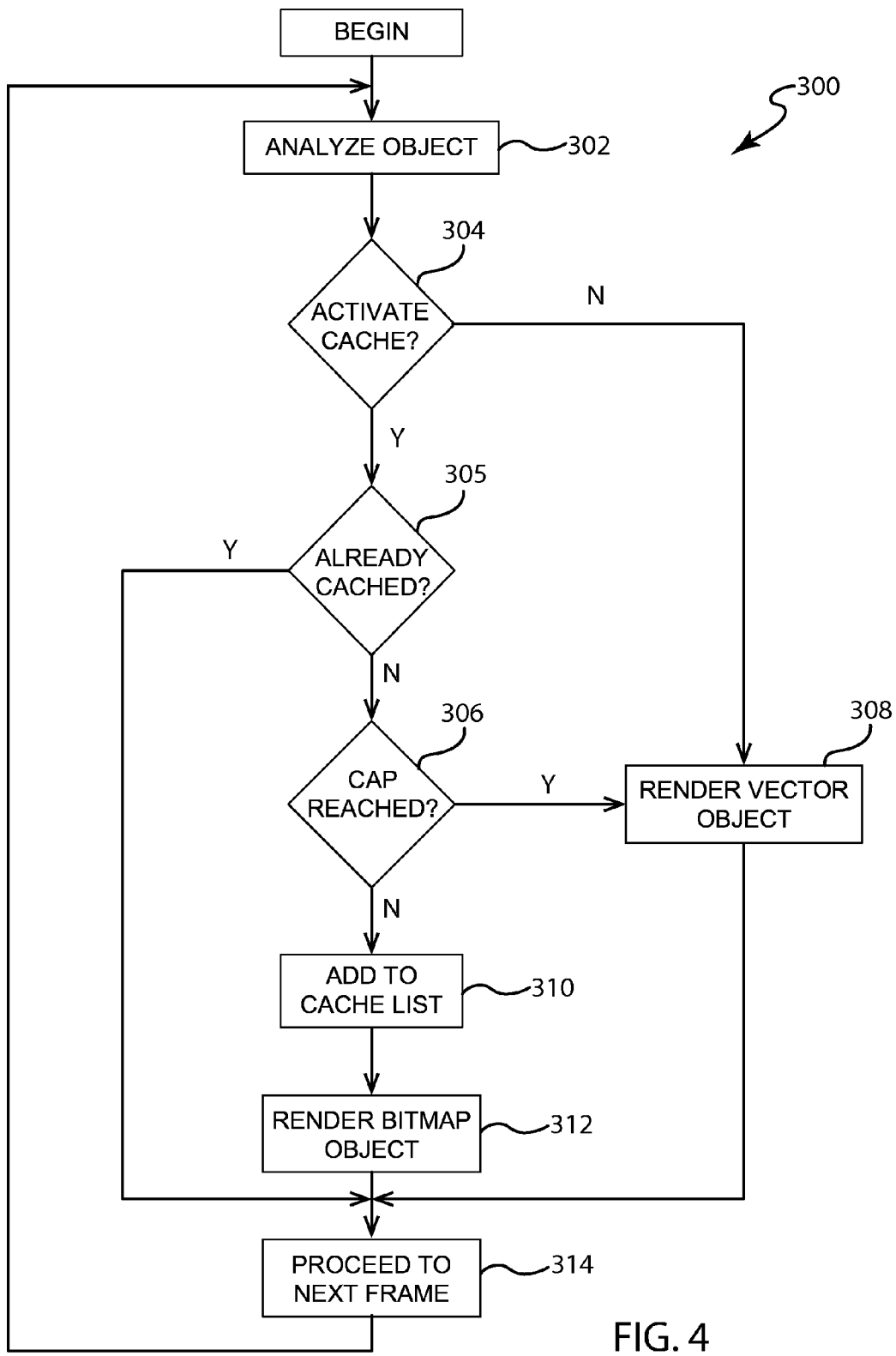
FIG. 4 is a flow chart illustrating a method for enhancing performance of the interactive video game.

The system 200 is configured to enhance performance by predicting future interactions or movements of the user actuated objects 102a-n and using the prediction to assign processing resources. FIG. 4 is a flow chart illustrating a method that enhances performance of the game 100. With reference to FIG. 4, the method 300 may begin with operation 302 and one or more objects within the game 100 are analyzed to predict future actions/movements. In some embodiments, one or more of the user actuated objects 102a-n are evaluated to determine if they will be moved by the user in the next frame or set of frames. As one example, the processing element 208 of the client devices 204a-n looks to preceding frames to extrapolate the actions of the user actuated object 102a-n in the proceeding frames. The processing element 208 may evaluate whether the user actuated object was moved in the preceding frame, if not the processing element 208 may use the non-action to predict that the user actuated object 102a-n will not be moved in the proceeding frame. That is, if the user does not move his or her user actuated object 102a-n for a set time frame, then the processing element 208 can predict that the user will not move the object in the next frame.

The processing element 208 may analyze other parameters in addition to or instead of analyzing movement. As some examples, the processing element 208 may look to typical user history with the game 100. For example, the processing element 208 may evaluate historical behavior of the user at certain instances such as when the user is at a certain level, portion of the game 100, scene 104, has collected certain objects (e.g., accessories, coins, etc.), is in a certain location of game 100, and so on, to predict the user's behavior in the future. As a specific example, if the user historically enters a new level or scene 104 of the game 100 and stands still for a few frames, the processing element 208 can predict that when the user actuated objects 102a-n enters the select level that the user will not move the object for a select number of frames. Other parameters include the actions by other users, such as movements of the remaining user actuated objects 102a-n, status of the game, and so on.

Other parameters include graphical user interface (GUI) interactions within the game itself or other interfaces on the computing device. For example, a player typing a chat message may be predicted to remain still in the following frame. Other GUI and/or game interactions that can be used as predictors include restrictions within the game based on certain inputs. As one example, if a user actuated object opens a newspaper or book within the game, the game may restrain them from moving until they close the newspaper or book. The processing element 208 can use this restraint to predict that the object will not move in the next frame. As another example, when a user actuated object is reviewing its collected inventory or accessories, the processing element may predict that the object will not move in the next frame as the user is evaluating information. In other words, while players are reading or interacting with objects within the game, or other GUI elements, they are may be less likely to move or interact with their user actuated object, which allows the processing element to predict that those objects will be still for a predetermined time period.

With continued reference to FIG. 4, after operation 302, the method 300 may proceed to operation 304. In operation 304 the processing element 208 determines whether a cache operation should be implemented for the analyzed object. In other words, the processing element predicts that the user actuated object 102a-n will not move in the next frame or next set of frames and therefore the object 102a-n can be cached. In instances where cache can be activated, the method 300 proceeds to operation 305.

However, if based on the analysis the processing element 208 predicts that the user actuated object 102a-n may move or at least may not be able to predict that that the user actuated object 102a-n will remain still, then the processing element 208 will determine to not activate the cache. If cache is not activated, the method 300 may proceed to operation 308. In operation 308 the processing element 208 renders the vector graphics corresponding to the user actuated object 102a-n. In this operation, the user actuated object 102a-n is recreated by analyzing the mathematical equations and geometric relationships and then redrawn based on the analysis. Once the user actuated object 102a-n is rendered, the method 300 may proceed to optional operation 314, which will be discussed below.

In operation 305, the processing element 208 determines whether the object has been previously cached. For example, the processing element 208 may analyze the previous frame to determine if the object was cached in that frame. If the object was previously cached, the method 300 proceeds to operation 314 (described below) as the object does not need to be rendered against as a bitmap object. In other words, the previously rendered bitmap object can be reproduced in the next frame and does not need to be recaptured. Operation 305 saves processing time in instances when an object is predicted to not move or not be animated during a number of frames. In these instances the cached bitmap of the object can be reused for each of the frames, without requiring the object to be re-cached. This allows the processing unit to save resources as the object may be cached in a first frame but then that copy is reused for 10 frames (or other any other number of frames), which saves a number of resources for the processing element. If in operation 305, the object has not been previously cached, the method 300 may proceed to operation 306.

In operation 306, the processing element 208 determines whether a cap on cached objects has been reached. In some embodiments, the processing element may limit the number of user actuated objects 102a-n and/or scene objects that are cached for a select frame. The limit on cached objects may be determined by the available space in the memory components 210. In some instances, each cached object requires memory space, which as the space is reduced can affect performance. Accordingly, in some instances the system 200 may set a cache limit for the game 100 to balance between increased processing time and storage space within the memory components 210. However, it should be noted that in some instances memory space may not be a concern and there may not be a limit on the number of objects to be cached. Alternatively, in instances where there may not be a significant number of users, the cache can be eliminated as at any given time the number of user actuated objects 102a-n to be cached may not substantially affect the resources of the memory components 210.

In operation 306, if the cache cap is reached, the method 300 may proceed to operation 308 and a vector graphic of the user actuated object will be rendered. In operation 306 if the cache cap has not been reached, the method 300 may proceed to operation 310. In operation 310 the user actuated object 102a-n may be added to a cache list. As one example, the processing element 208 may include a list of each object to be cached for a particular frame or set of frames. The list can include user actuated objects 102a-n, such as those that have been predicted to not change between frames, as well as those scene objects 106, 108, 110, 112, 114 that also do not change between frames. In a specific example, creating a cache list allows for multiple objects to be cached each frame, e.g., a first ten are cached in a first frame and a second ten (if still eligible to be cached) are cached in the second frame.

With continued reference to FIG. 4, after operation 310, the method 300 may proceed to operation 312. In operation 312, the objects on the cache list are rendered as bitmap objects. In particular, a bitmap caching feature may be activated to cache the vector graphics corresponding to the object and render the object as a bitmap internally. That is, the processing element 208 stores an image of the object 102a-n in the memory component 210. That saved bitmap object is then used in replace of the rendered graphic in the scene 104.

Once the object 102a-n has either been cached and rendered as a bitmap object in operation 312 or has been redrawn and rendered as a vector object in operation 308, the method 300 proceeds to operation 314. In operation 314, the game 100 proceeds to the next frame and uses the cached object or the vector object to display the user actuated object 102a-n. After operation 314, the method 300 may return to operation 302 to analyze objects within the current frame to determine if they will be cached Using the method 300 of FIG. 4, the performance, in particular the speed, of the game 100 may be increased. This is because for each use actuated object 102a-n that can be cached and rendered as a bitmap object, the processing element 208 for the client devices 204a-n or the server 202 (if rendering the objects) may pull the saved image from the memory component quicker than re-rendering the vector graphic of the object. Depending on the number of user actuated objects 102a-n that are cached per frame, the game 100 may have an increase of frame rate of 20 to 30% as compared to instances when user actuated objects are not cached. The increase in performance may be more apparent in instances where the objects may have detailed representations. For example, the more accessories, outfits, appearances, colors, ornate elements, or the like of the objects within the game, the longer it may take the processing element to render the objects by vectors and caching the objects eliminates the requirement that the objects be drawn by vectors for a frame saving processing resources and increasing frame rate.

Figure 5:
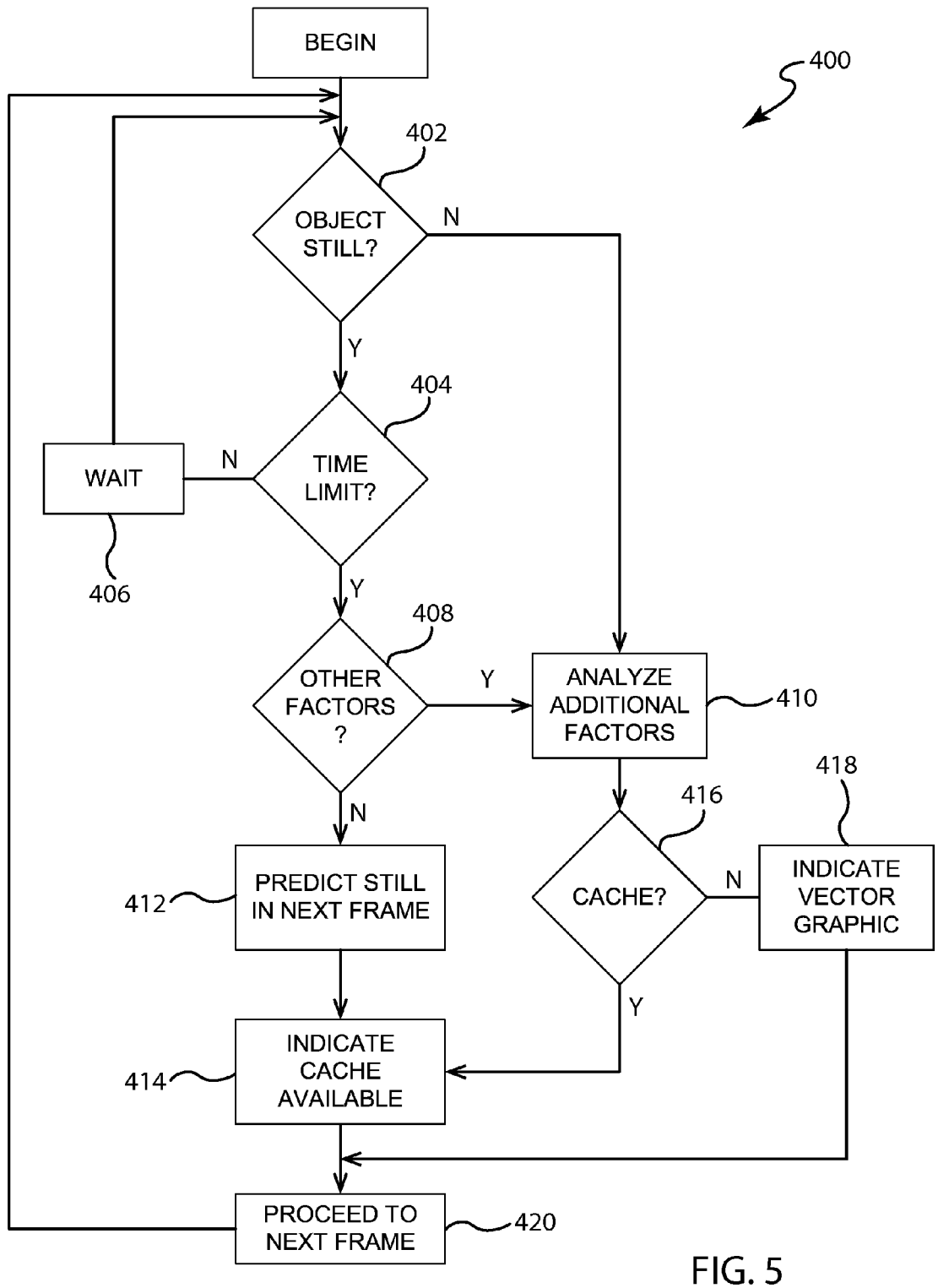
FIG. 5 is a flow chart illustrating a method for using movement of a user actuated object to predict future actions of the user actuated object.

As briefly explained with respect to operation 302 in FIG. 5, in some instances the movement of the user actuated object may be analyzed to determine whether the object can be cached. FIG. 5 is a flow chart illustrating an illustrative method for using movement of the user actuated object to predict future actions of the object. With reference to FIG. 5, the method 400 may begin with operation 402. In operation 402 the processing element 208 determines whether the object is still. Typically, the processing element may analyze the current frame of the game 100 to determine whether an object moved, repositioned, changed orientation, or the like.

In operation 402, if the user actuated object 102a-n did not move, the method 400 proceeds to operation 404 and if the object did move the method 400 proceeds to operation 410.

In operation 404 the processing element 208 further determines whether the object has remained still for a predetermined time limit. In some embodiments, the predetermined time is selected as a minimum threshold that an object has to pass to be considered not moving for purposes of cache. As one example, the method may require that the object be still for two to four frames before it will be predicted as still in the proceeding frame. The time limit, whether it be analyzed by seconds, frames, or other metric, may be set as desired and may vary based on user, game type, game level, or the like. As another example, the method may require that the object be still for 2 to 5 seconds before being predicted as being still.

If in operation 404, the time limit has not yet been reached, the method 400 may proceed to operation 406. In operation 406, the method 400 may pause to before returning to operation 402. By waiting, the method 400 allows additional time to pass before reanalyzing the object to determine if it has moved.

In operation 404, if the user actuated object 102a-n has been still for the preselected time period, the method 400 may proceed to optional operation 408. In operation 408, the processing element 208 may evaluate additional factors that can be used to determine if the user actuated object 102a-n is available for cache. In these embodiments, the time that the user actuated object has been still may be combined with other parameters, such as user preferences, user behavior history, settings, game layout, game level, or the like, to determine whether the user actuated object is available to be cached. However, analyzing additional factors may require additional processing time and therefore in some instances only a single factor (such as time) may be evaluated.

If additional factors are to be analyzed, the method 400 proceeds to operation 410. In operation 410, the processing element 208 analyzes the additional factors to determine if those factors lead to a prediction that the user actuated object 102a-n will not be moved in the next frame or set of frames. In instances where the object is not still in operation 402, the method 400 may proceed to operation 410 to analyze factors other than time that the object has remained still to determine if the object is available to be cached. For example, in some instances although the object may be moving in the current frame other factors may lead to a prediction that the object will not move in the next frame or set of frames, e.g., if the use actuated object enters a new level during the current frame and historically the user has not moved his or her user actuated object for a few frames after entering a new level.

After operation 410, the method 400 may proceed to operation 416. In operation 416, the processing element 208 determines whether the user actuated object 102a-n should be cached based on the additional factors analyzed. It should be noted that even if the object has been still for the predetermined time, that in some instances the additional factors may indicate that the user actuated object should not be cached. On the other hand, in some instances the additional factors may indicate to the processing element that the user actuated object can be cached even though the object has not been still for the predetermined time period. If the processing element predicts that the object can be cached, the method 400 may proceed to operation 414. However, if the object is predicted to move or otherwise should not be cached, the method 400 proceeds to operation 418. In operation 418, the user actuated object 102a-n is determined to be rendered as a vector object for the proceeding frame.

With continued reference to FIG. 5, if in operation 408 additional factors are not analyzed, the method 400 proceeds to operation 412. In operation 412 the processing element 208 predicts that the user actuated object 102a-n will remain still in the next frame or is otherwise available to be cached. After being predicted as being still, the method 400 proceeds to operation 414 and the processing element 208 indicates that the user actuated object 102a-n is available for caching. This operation 414 may lead to the user actuated object 102a-n being added to a cache list as described in operation 310 in method 300.

After operations 414 and 418, the method 400 proceeds to operation 420. In operation 420, the processing element 208 proceeds the game 100 to the next frame. The user actuated object 102a-n may then be rendered either as a cached bitmap object or a vector graphic.

CONCLUSION

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for enhancing performance of interactive content comprising:
   analyzing by a processing element a user actuated object of the interactive content;
   predicting action of the user actuated object in a proceeding frame of the interactive content;
   using the predicted action determining by the processing element if the user actuated object can be cached for the proceeding frame;
   if the user actuated object can be cached, saving the user actuated object as a bitmap object and displaying the bitmap object in the proceeding frame; and if the user actuated object cannot be cached, rendering a vector graphic of the user actuated object in the proceeding frame.

2. The method of claim 1, wherein the processing element analyzes movement of the user actuated object in preceding frame to predict action of the user actuated object.

3. The method of claim 2, wherein the processing element determines whether the user actuated object has remained still for a predetermined time period to predict action of the user actuated object.

4. The method of claim 1, wherein the processing element analyzes historical user behavior of a user actuating the user actuated object to predict action of the user actuated object.

5. The method of claim 1, wherein the interactive content is a network based video game.

6. The method of claim 5, wherein the interactive content is a massive multi player online game.

7. The method of claim 1 further comprising:
determining by the processing element whether a cache threshold has been;
if the cache threshold has been reached indicating that the user actuated object cannot be cached; and
if the cache threshold has not been reached indicating that the user actuated object can be cached.

8. A computing device for executing an interactive content program comprising:
a non-transient memory component storing executable programming instructions;
an input/output interface configured to transmit and receive data; and
a processor in communication with the memory component and the input/output interface, the processor configured to execute the programming instructions, which when executed perform the following operations:
predict a future action of a user actuated object of the interactive content program; and
selectively store a bitmap of the user actuated object based on the predicted future action of the user actuated object.

9. The computing device of claim 8, wherein the future action of the user actuated object is predicted by analyzing movement of the user actuated object in a first frame of the interactive content program.

10. The computing device of claim 9, wherein if the user actuated object is still in the first frame, the user actuated object is predicted to not move in a second frame and the processor selectively stores the bitmap object of the user actuated object and renders the bitmap object in the second frame.

11. The computing device of claim 8, wherein the interactive content is transmitted to the input/output interface from an external computing device.

12. A method for reducing processing load of a processing element running a video game, comprising:
analyzing by the processing element movement of a character controlled by a user input;
determining by a processor whether the character remained still during a predetermined time limit of the video game;
when the character remains still during the predetermined time limit, indicating by the processing element that the character is available to be cached; and
when the character does not remain still during the predetermined time limit, indicating by the processing element that the character is to be rendered as a vector graphic.

13. The method of claim 12, further comprising:
determining by the processing element whether a cache threshold has been reached;
if the cache threshold has not been reached, caching the character in a memory component and rendering by the processing element the character in a next available frame of the video game by using the cached character stored in the memory component; and
if the cache threshold has been reached, rendering by the processing element the vector graphic of the character.

14. The method of claim 13, wherein the video game is network based multiple player interactive video game.

15. The method of claim 12, wherein the predetermined time limit is between three to four seconds.

16. The method of claim 12, wherein the character comprises:
a first character controlled by a first user input; and
a second character controlled by a second user input.

* * * * *